United States Patent
Gretz (10) Patent No.: US 10,128,646 B1
(45) Date of Patent: Nov. 13, 2018

(54) TWO-GANG TV BRIDGE KIT WITH PRE-MOLDED ELECTRICAL CORD FOR MINIMIZING WIRING TERMINATIONS

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

(*) Notice: Subject to any disclaimer, the term of this patent is extended or adjusted under 35 U.S.C. 154(b) by 0 days.

(21) Appl. No.: 15/914,715

(22) Filed: Mar. 7, 2018

Related U.S. Application Data (60) Provisional application No. 62/470,919, filed on Mar. 14, 2017.

(51) Int. Cl.
*H02G 3/08* (2006.01)
*H02G 3/12* (2006.01)
*H01R 25/00* (2006.01)
*H01R 24/76* (2011.01)

(52) U.S. Cl.
CPC ............. *H02G 3/126* (2013.01); *H01R 24/76* (2013.01); *H01R 25/006* (2013.01)

(58) Field of Classification Search
CPC   H02G 3/08; H02G 3/081; H02G 3/22; H02G 3/24; H02G 3/26; H02G 3/28; H02G 3/286; H02G 3/30; H02G 3/36; H02G 3/386; H02G 3/12; H02G 1/00; H01R 24/76; H01R 25/006

USPC ... 174/480, 481, 483, 505, 50, 53, 535, 559, 174/58; 220/3.2–3.9, 4.02; 248/68.1, 49
See application file for complete search history.

(56) References Cited

U.S. PATENT DOCUMENTS

| | | | |
|---|---|---|---|
| 7,367,121 B1 | 5/2008 | Gorman | |
| 7,525,043 B1 | 4/2009 | Gretz | |
| 7,557,308 B2 | 7/2009 | Dinh | |
| 7,563,979 B1 | 7/2009 | Gretz | |
| 7,841,878 B2 | 11/2010 | Johnson et al. | |
| 7,897,870 B1 * | 3/2011 | Gretz | H02G 3/14 174/135 |
| 8,314,350 B1 * | 11/2012 | Gretz | H02G 3/14 174/650 |
| 8,568,895 B2 | 10/2013 | Kharazipour et al. | |
| 8,975,518 B1 | 3/2015 | Gretz | |
| 9,263,863 B2 | 2/2016 | DeCosta | |
| 9,318,888 B1 | 4/2016 | Baldwin et al. | |

(Continued)

*Primary Examiner* — Angel R Estrada (57) ABSTRACT

A TV bridge kit including a kit, package, or assembly of components for providing power supply and low voltage cables to a TV or similar electronic device while minimizing disruption to the wall surface. The assembly includes a first and second mounting bracket with associated cover plates and a molded power cable including a male plug end and a female receptacle end. Rotatable clamp arms on the mounting brackets enable rapid installation to existing structural walls. The cover plates include openings and peripheral walls and are adapted for selective mounting of the male or female plug ends and a low voltage device. Mounting of the mounting brackets in vertical alignment in a wall portion sharing a common interior wall cavity between two studs enables rapid installation of power and low voltage feeds to the TV. The TV bridge kit assembly may include trim plates for attachment to the mounting brackets.

6 Claims, 14 Drawing Sheets

(56) References Cited

U.S. PATENT DOCUMENTS 9,531,177 B1    12/2016  Gretz
9,543,743 B2 *  1/2017  Valenti ..................... H02G 3/14

\* cited by examiner

TWO-GANG TV BRIDGE KIT WITH PRE-MOLDED ELECTRICAL CORD FOR MINIMIZING WIRING TERMINATIONS

CROSS-REFERENCE TO RELATED APPLICATIONS

This application claims priority to provisional U.S. application No. 62/470,919, filed Mar. 14, 2017, the contents of which are incorporated herein in their entirety.

FIELD OF THE INVENTION

This invention relates to the installation of electrical components and specifically to two-gang pre-wired television (TV) bridge kit that eliminates the need to disturb wall studs and minimizes the amount of time required by an installer to provide power and low voltage connections on a wall for the mounting of a flat panel TV or similar device thereto.

BACKGROUND OF THE INVENTION

It is common for homeowners to mount flat panel televisions and similar electrical devices on a wall. This often requires the installation of a new electrical outlet to provide electrical feed to the device. Installation of the electrical outlet typically requires the installer to run electrical feed to the device from some distance away and would require removal of the wall surface, such as wallboard, drilling through the joists, and then pulling electrical cable from an existing outlet to the newly installed outlet.

Although previous versions of TV bridge kits have been proposed, the kits typically required an installer to perform the time intensive task of running cable between the boxes and completing wire terminations within each box.

What is needed therefore is a pre-wired TV bridge kit and method that provides a means of supplying both high and low voltage connections at a distance from an existing wall outlet and which eliminates the need for making wiring terminations, thereby enabling a homeowner to rapidly provide electrical power and low voltage connections to a wall-mounted TV or similar electrical device at a location in proximity to the TV. The TV bridge kit would preferably eliminate the need for altering the surrounding wall surface and underlying studs, eliminate the need to pull power and low voltage cables through adjacent studs in the wall, eliminate the need to make extensive repairs to the drywall and wall surface after the cables are installed, and eliminate the need to make wiring connections, such as high voltage conductors to the terminals of an electrical component.

BRIEF SUMMARY OF THE INVENTION

The invention is a TV bridge kit including a kit, package, or assembly of components for mounting a TV to a wall while minimizing disruption to the wall surface. The kit includes a pair of mounting brackets with associated cover plates and an electrical cable including a male plug end and a female receptacle end. The mounting brackets include rotatable clamp arms to enable rapid installation to existing structural walls. The cover plates include openings and peripheral walls and are adapted for mounting of an electrical receptacle and a low voltage device. The plug ends of the electrical cable enable connect into bosses on the back side of the peripheral walls of the cover plates. An outer flange on the mounting brackets enable recessed mounting of the cover plates within the mounting brackets. The TV bridge kit simplifies the task of providing an electrical outlet on a portion of the wall that is remote from an existing plug. After mounting the mounting brackets to a wall, a conventional extension cord is simply plugged into an existing outlet in order to feed power from the existing outlet to the installed TV bridge kit and thus energize the female receptacle. The TV bridge kit includes a pre-molded cable with plug ends integrally molded with the cable, to eliminate the need for performing on-site wiring terminations between wire conductors and terminals, thus vastly simplifying the installation task and minimizing the time for installing power to a wall-mounted TV or similar electronic device. The TV bridge kit also eliminates the need to remove drywall, drill studs, and feed electrical supply cable through the studs in order to power the electrical receptacle.

OBJECTS AND ADVANTAGES

The TV bridge kit enables an installer to rapidly and easily provide power to a wall-mounted TV by eliminating the need to remove drywall or disrupt the wall surface and underlying studs surrounding the TV.

The TV bridge kit eliminates the need for making wiring terminations, such as high voltage conductors to the terminals of an electrical component, for supplying power for a wall-mounted electrical device such as a TV.

The TV bridge kit eliminates the need to alter underlying studs in order to supply electricity to a wall-mounted TV.

The TV bridge kit obscures unsightly cables surrounding the wall-mounted TV to which it supplies power.

The TV bridge kit includes a power cable having plug ends integrally molded with the cable, which pre-molded cable eliminates the need for performing on-site wiring terminations between wire conductors and terminals, thus vastly simplifying the installation task and minimizing the time for installing power to a wall-mounted TV or similar electronic device.

The TV bridge kit may be used as a two-gang device for routing both a high voltage cable and one or more low voltage cables through a common space between two existing studs or may be configured as a one-gang device for supplying electrical power only.

Components are not energized until the power extension cord is plugged into an existing outlet or surge protector.

The TV bridge kit enables side-by-side mounting of both a high voltage device and a cable entry device, such as a cable port, for entry or exit of one or more low voltage cables.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
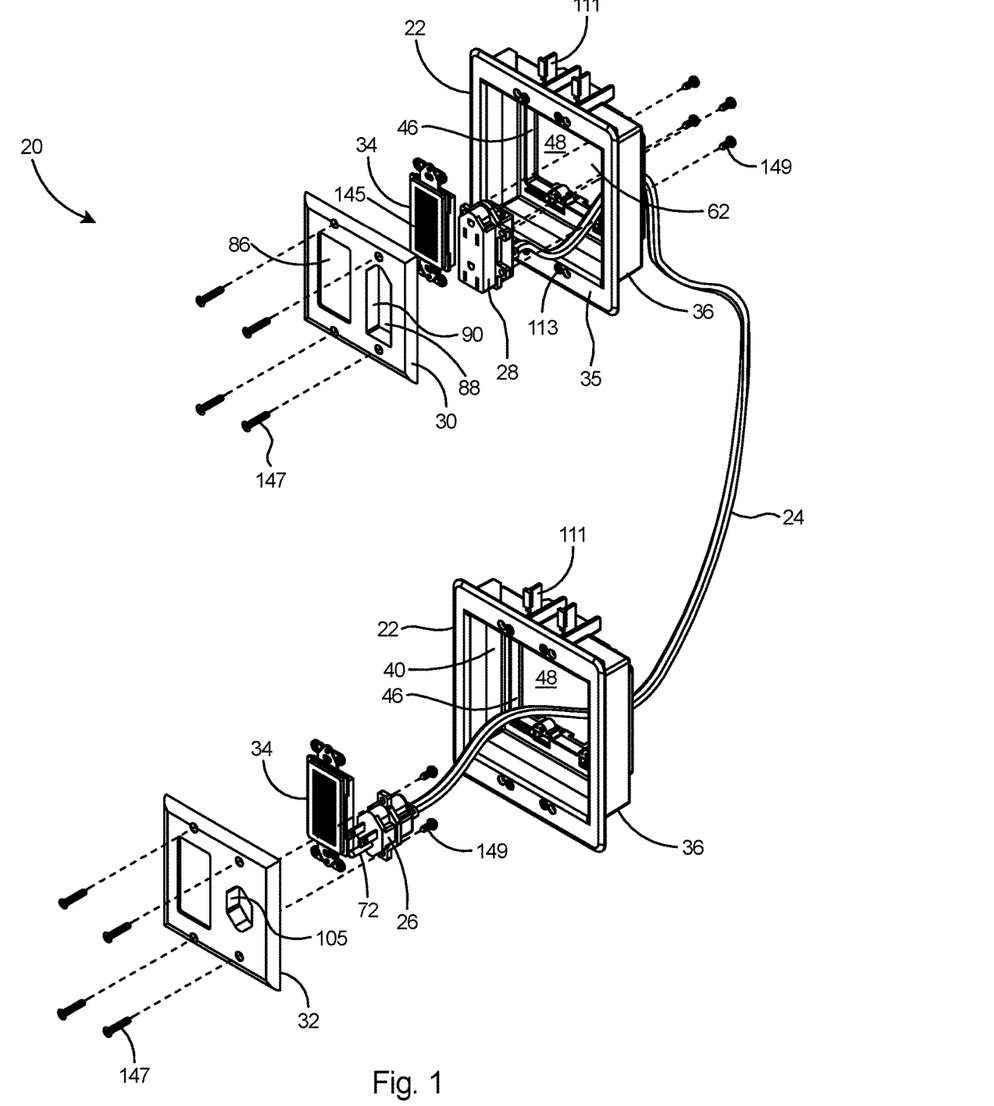
FIG. 1 is a front exploded isometric view of a first and preferred embodiment of a pre-wired TV bridge kit, in accordance with embodiments of the invention.
Figure 2:
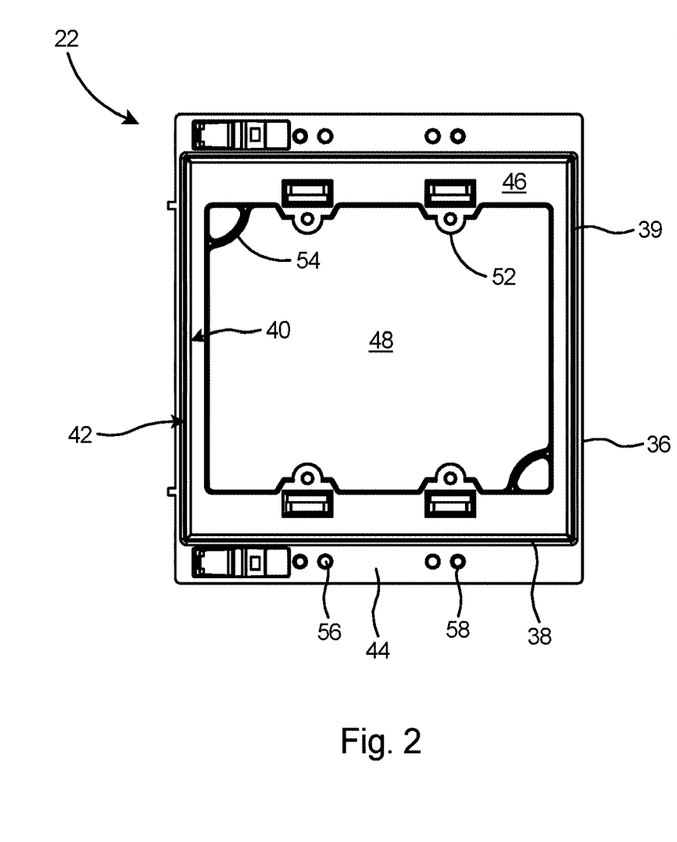
FIG. 2 is a front elevation view of a two-gang mounting bracket that forms a portion of the TV bridge kit of FIG. 1.
Figure 3:
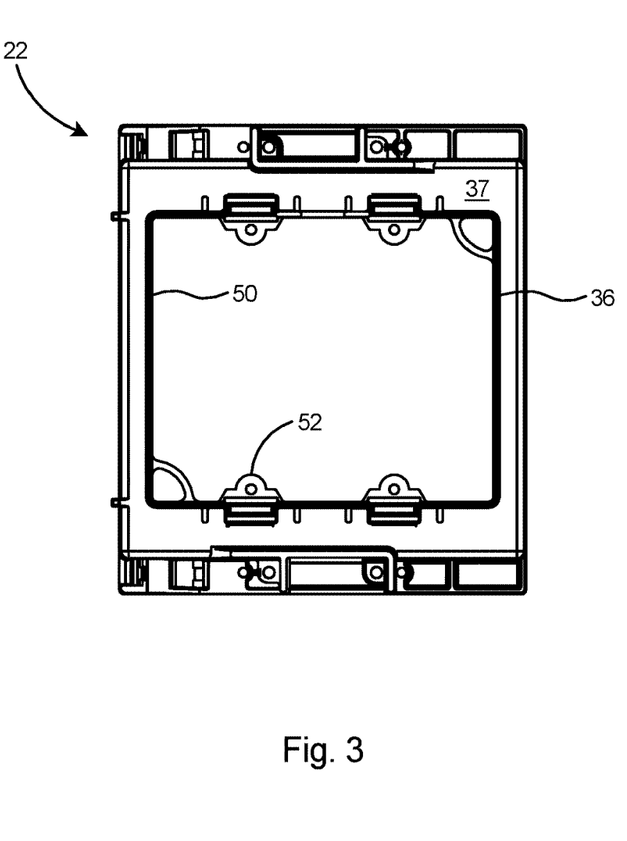
FIG. 3 is a rear elevation view of the two-gang mounting bracket.
Figure 4:
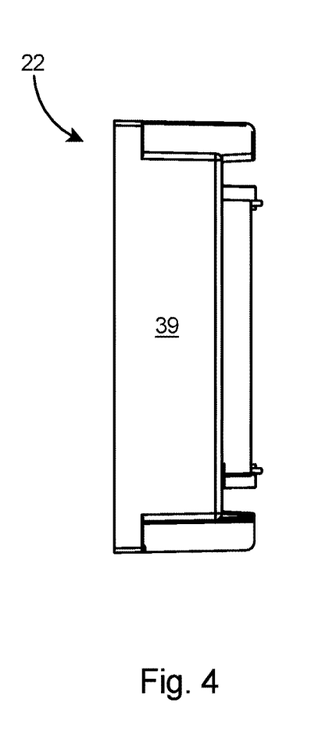
FIG. 4 is a side view of the two-gang mounting bracket.
Figure 5:
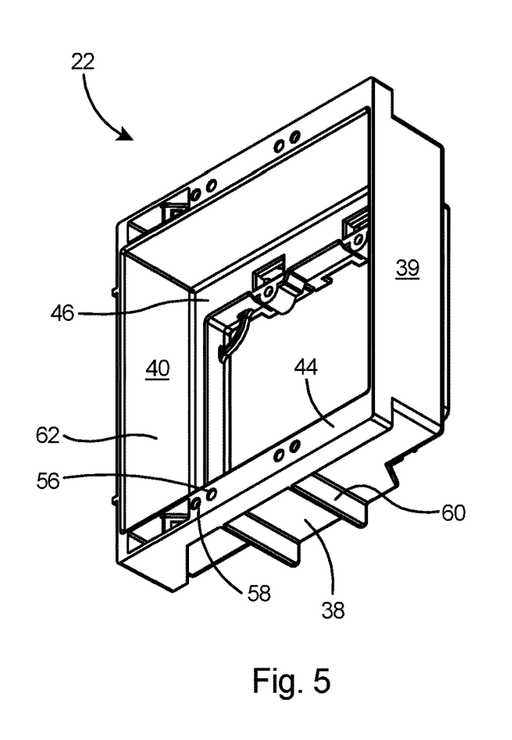
FIG. 5 is a front isometric view of the two-gang mounting bracket.

With reference to FIG. 1, there is shown a preferred embodiment of a pre-assembled or pre-wired TV bridge kit 20 according to the present invention. The pre-wired TV bridge kit 20 includes two mounting brackets 22, a power cable 24 with a power input end 26 and a power output end 28, a first or upper cover plate 30 and a second or lower cover plate 32. The pre-wired TV bridge kit may further include a cable entry device 34 for adapting the cover plates 30 and 32 for the passage of low voltage cables there through. A trim plate 35 is secured to each mounting bracket 22. The pre-wired TV bridge kit 20 is a two-gang bridge kit as it may be configured to for supplying both high voltage and low voltage devices in a location that is remote from an existing electrical plug.

The meaning of the term "pre-wired" as used herein refers to the fact that there is no need to make wiring terminations for the power supply, such as connecting the conductors of electrical cables to terminals within the mounting brackets. The pre-wired TV bridge kit thus enables a homeowner to easily install power supply to a wall-mounted TV.

Figure 6:
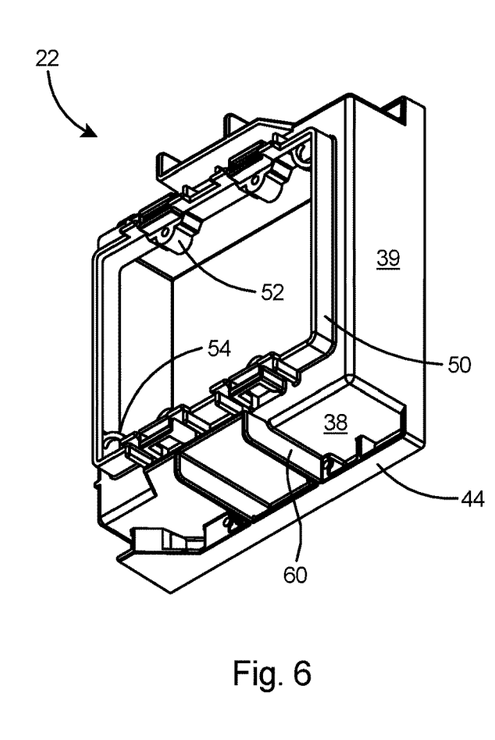
FIG. 6 is a rear isometric view of the two-gang mounting bracket.
Figure 7:
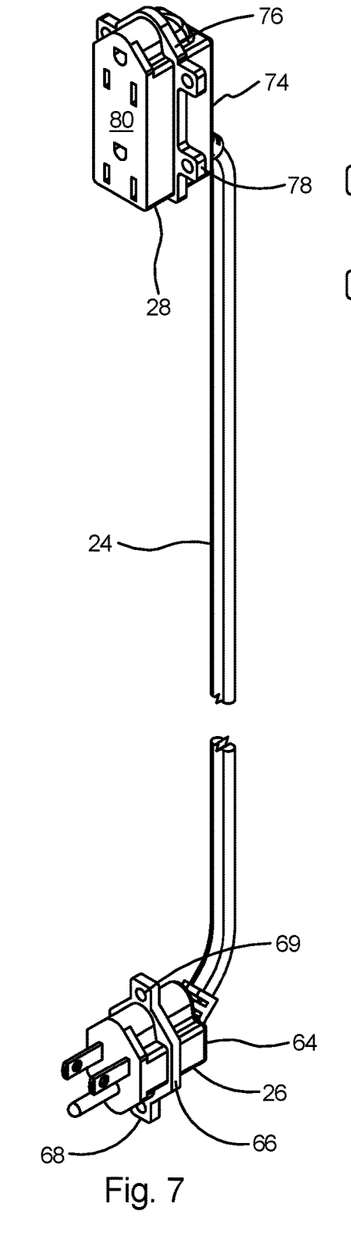
FIG. 7 is an isometric view of a power cord with molded plug ends that forms a portion of the TV bridge kit of FIG. 1.
Figure 8:
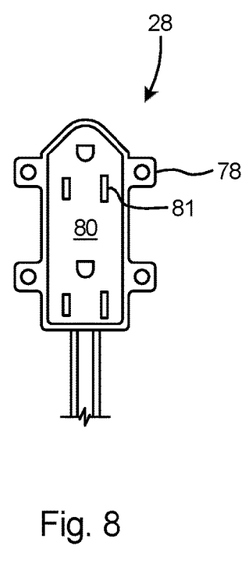
FIG. 8 is a front elevation view of the female plug end of the power cord.
Figure 9:
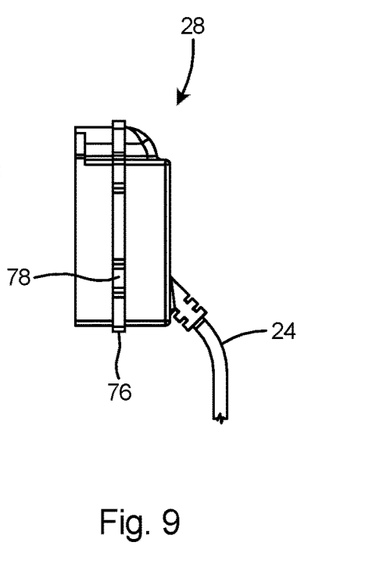
FIG. 9 is a side view of the female plug end of the power cord.
Figure 10:
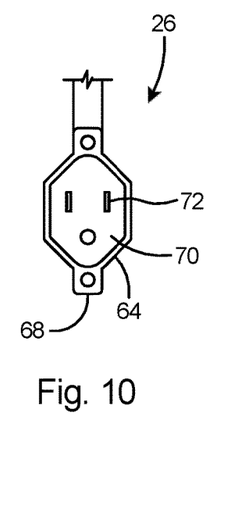
FIG. 10 is a front elevation view of the male plug end of the power cord.
Figure 11:
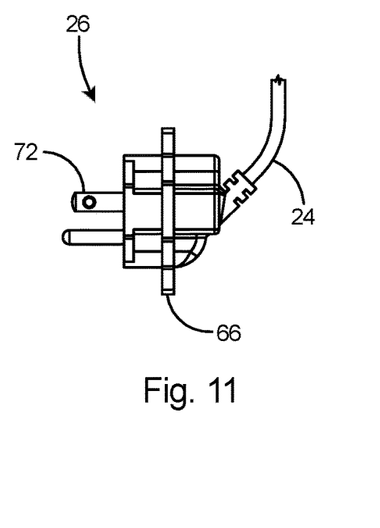
FIG. 11 is a side view of the male plug end of the power cord.
Figure 12:
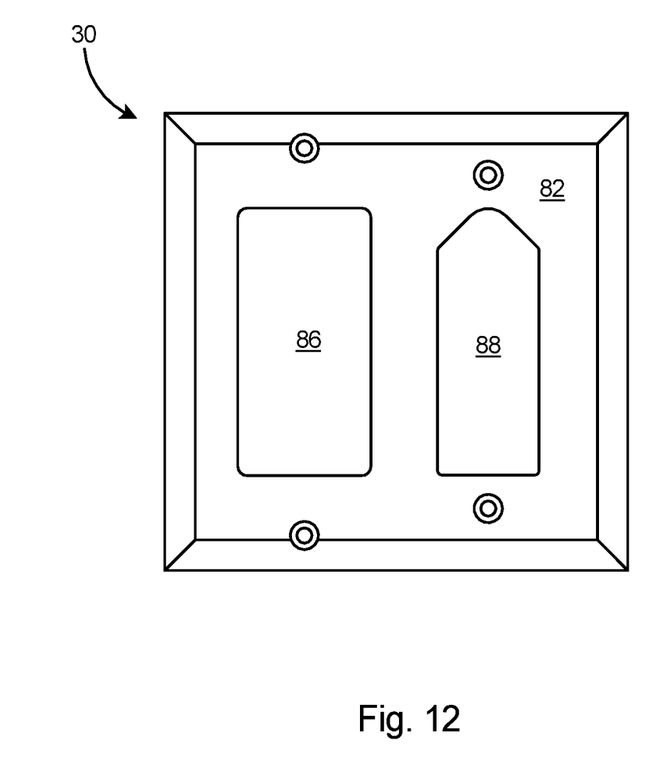
FIG. 12 is a front elevation view of a first two-gang cover plate that forms a portion of the TV bridge kit of FIG. 1.
Figure 13:
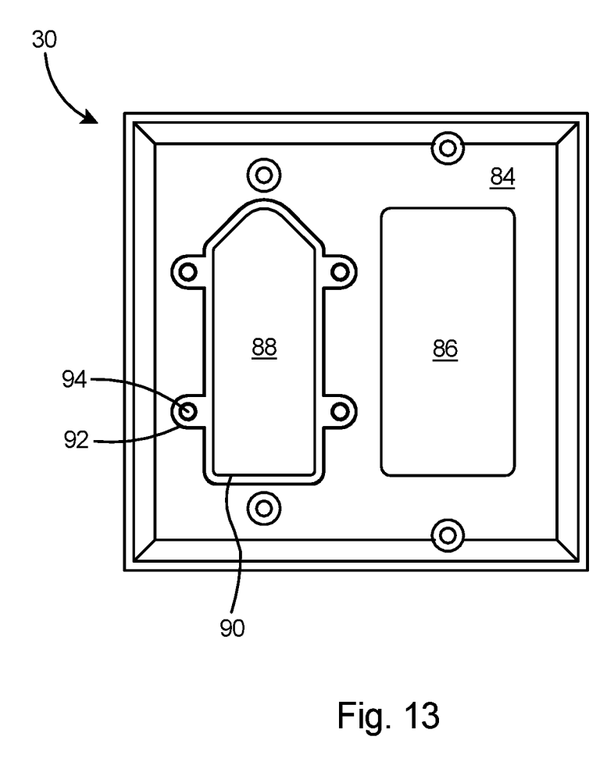
FIG. 13 is a rear elevation view of the first two-gang cover plate.
Figure 14:
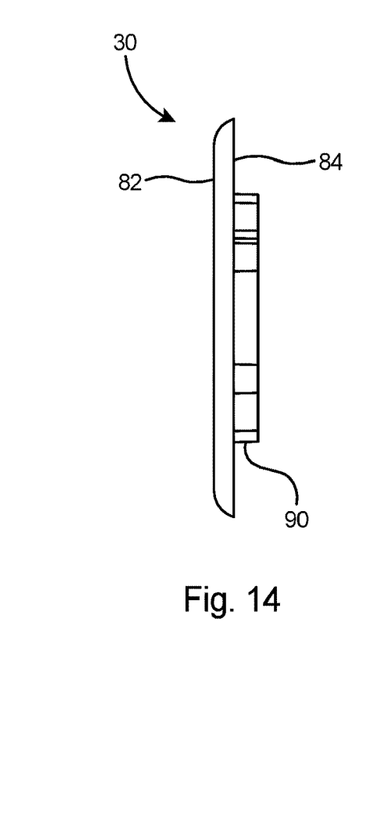
FIG. 14 is a side view of the first two-gang cover plate.
Figure 15:
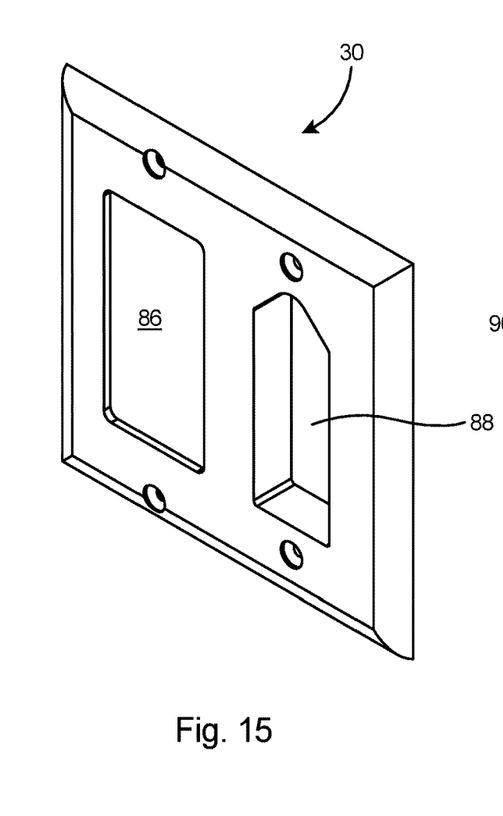
FIG. 15 is a front isometric view of the first two-gang cover plate.
Figure 16:
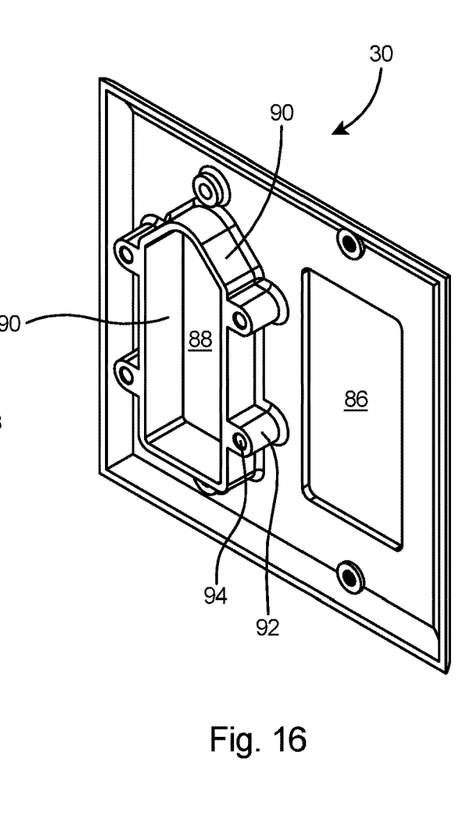
FIG. 16 is a rear isometric view of the first two-gang cover plate.
Figure 17:
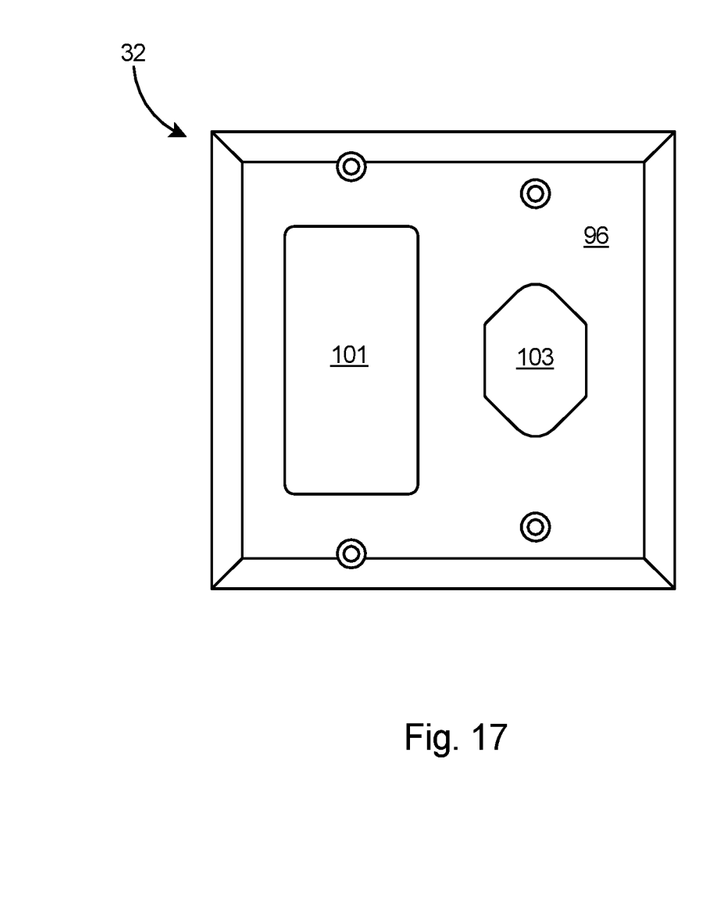
FIG. 17 is a front elevation view of a second two-gang cover plate that forms a portion of the TV bridge kit of FIG. 1.
Figure 18:
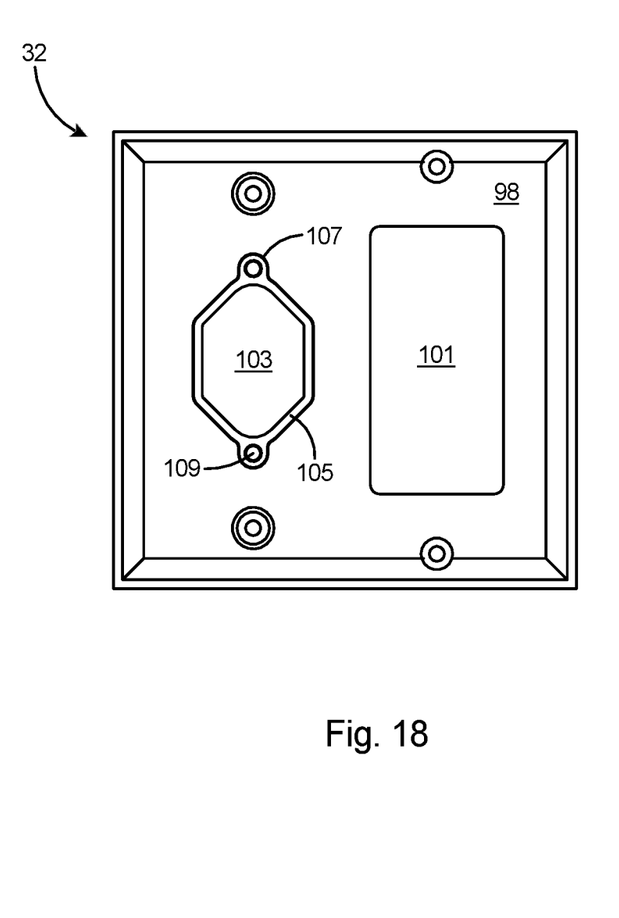
FIG. 18 is a rear elevation view of the second two-gang cover plate.
Figure 19:
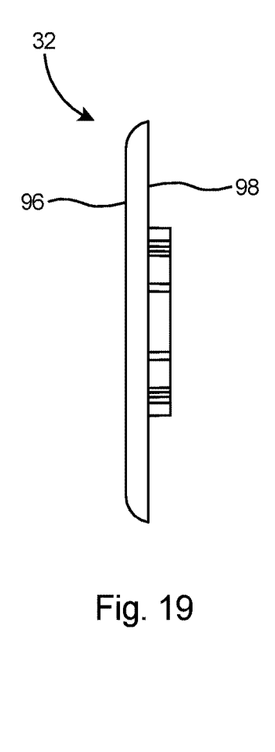
FIG. 19 is a side view of the second two-gang cover plate.
Figure 20:
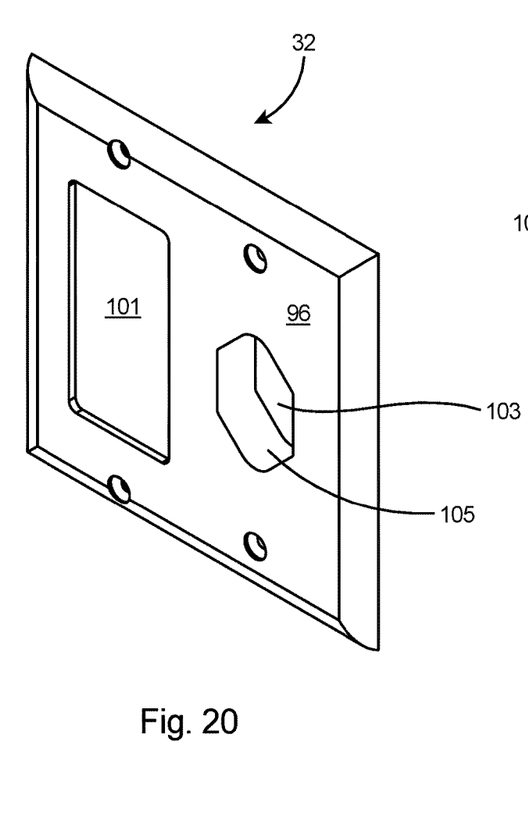
FIG. 20 is a front isometric view of the second two-gang cover plate.
Figure 21:
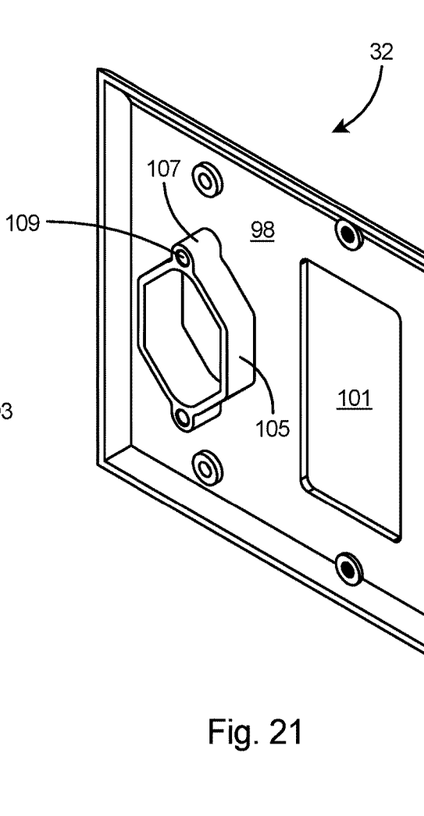
FIG. 21 is a rear isometric view of the second two-gang cover plate.

Referring to FIGS. 2-6, the mounting bracket 22 includes a frame 36 having a rear surface 37, side walls 38 and end walls 39. The side walls 38 include an inner surface 40 and outer surface 42. A flange 44 extends outward from two opposing side walls and a recessed wall 46 extends inward from the inner surface 40 of each side wall to an opening 48. A collar 50 extends from the rear surface 37 of the mounting bracket around the periphery of the opening 48 and includes bosses 52 for the mounting of electrical components (not shown). A cable tie-off 54 extends across the opening 48 between adjacent portions of the collar 50. The flange 44 includes inner apertures 56 and outer apertures 58. As shown in FIG. 6, two ribs 60 extend from the flange 44 and along a pair of the side walls 38. The frame 36, side walls 38, end walls 39, and recessed wall 46 cooperate to form an electrical enclosure 62 within the mounting bracket 22.

With reference to FIGS. 7-11, power input end 26 and power output end 28 are preferably plug ends integrally molded with the power cable 24, with the plug ends integral with the cable. Power input end 26 includes a plug body 64, a mid-body flange 66, and two tabs 68 extending from the mid-body flange 66. Tabs 68 include apertures 69 therein. Power input end 26 further includes a front face 70 and electrical prongs 72 extending from the front face. Power output end 28 includes a plug body 74, a flange 76, tabs 78, a front face 80, and apertures 81 adapted to receive plug-in of the male end of a power cord (not shown).

Referring to FIGS. 12-16, upper cover plate 30 includes a front side 82 and a rear side 84 with a low voltage opening 86 and a high voltage opening 88 therein. A peripheral wall 90 extends from the rear side 84 of the upper cover plate 30 around the periphery of the high voltage opening 88. The peripheral wall 90 includes bosses 92 with bores 94 adapted to accept mounting of the power output end 28 (see FIG. 1) of the power cable 24 thereto. High voltage opening 88 is adapted to receive the front face 80 of power output end 28 therein.

Referring to FIGS. 17-21, lower cover plate 32 includes a front side 96 and a rear side 98 with a low voltage opening 101 and a high voltage opening 103 therein. A peripheral wall 105 extends from the rear side 98 of the lower cover plate 32 and around the periphery of the high voltage opening 103. The peripheral wall 105 includes bosses 107 with bores 109 adapted to accept mounting of the power input end 26 (see FIG. 1) of power cable 24 thereto. High voltage opening 103 is adapted to receive the front face 70 of power input end 26 therein.

Figure 22:
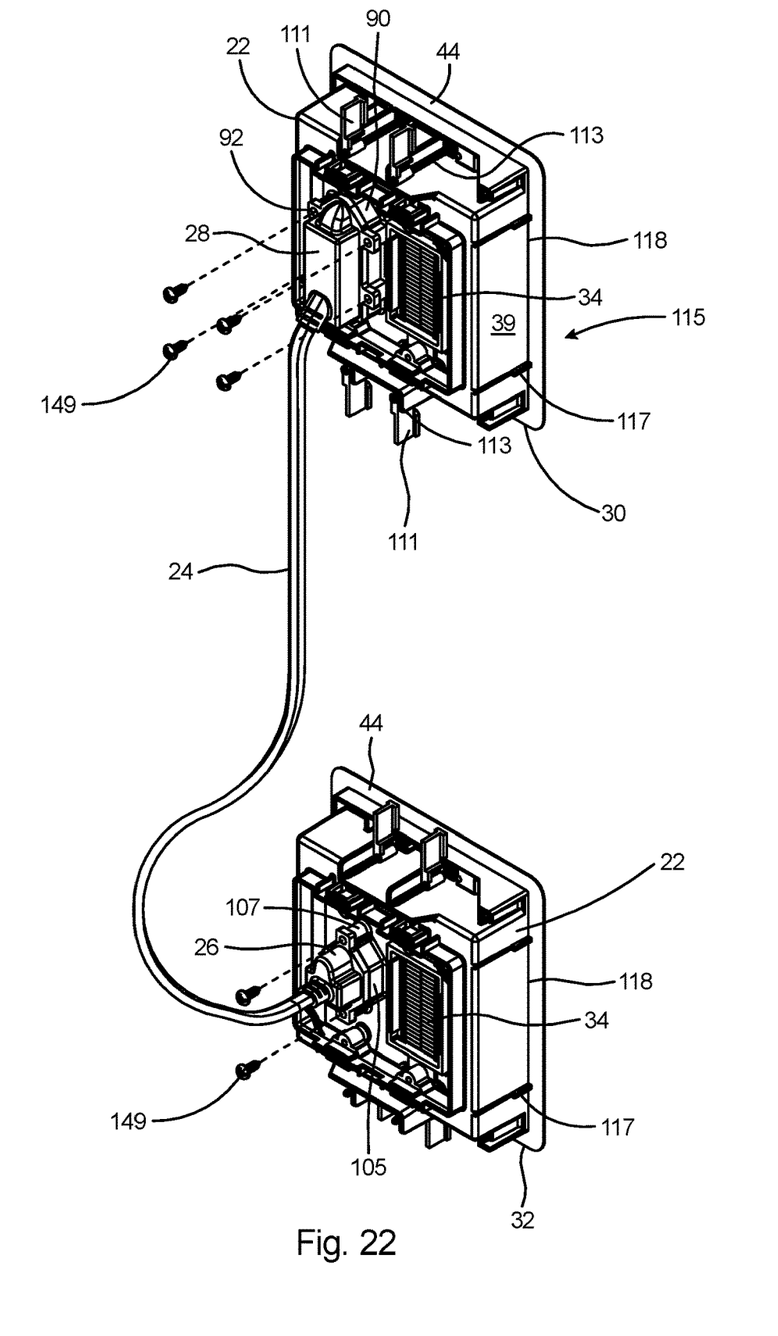
FIG. 22 is a rear isometric view of the first and preferred embodiment of the pre-wired TV bridge kit of FIG. 1.

Referring to FIG. 22, each mounting bracket includes rotatable clamp arms 111 that enable easy attachment to a wall (not shown). The clamp arms are attached to mounting fasteners 113 that extend through the flange 44 of the mounting bracket.

The end walls 39 of the mounting bracket include a mounting bracket positioning arrangement 115. The mounting bracket positioning arrangement includes parallel spaced apart tabs 117 extending from the front edge 118 of the mounting bracket 22. The tabs 117 include a length that corresponds to the thickness of a conventional wallboard, preferably 0.5 inch, to enable an installer, in a new work situation, to rapidly position the mounting bracket with respect to a stud. Placing end wall 39 of mounting bracket 22 against the stud and sliding the mounting bracket back until tabs 117 contact the stud (not shown) will establish the position of the mounting bracket with the proper extension from the stud to accommodate the wallboard thickness. Power input end 26 and power output end 28 are secured to the peripheral walls 90 and 105 of an upper cover plate 30 and a lower cover plate 32 respectively.

Figure 23:
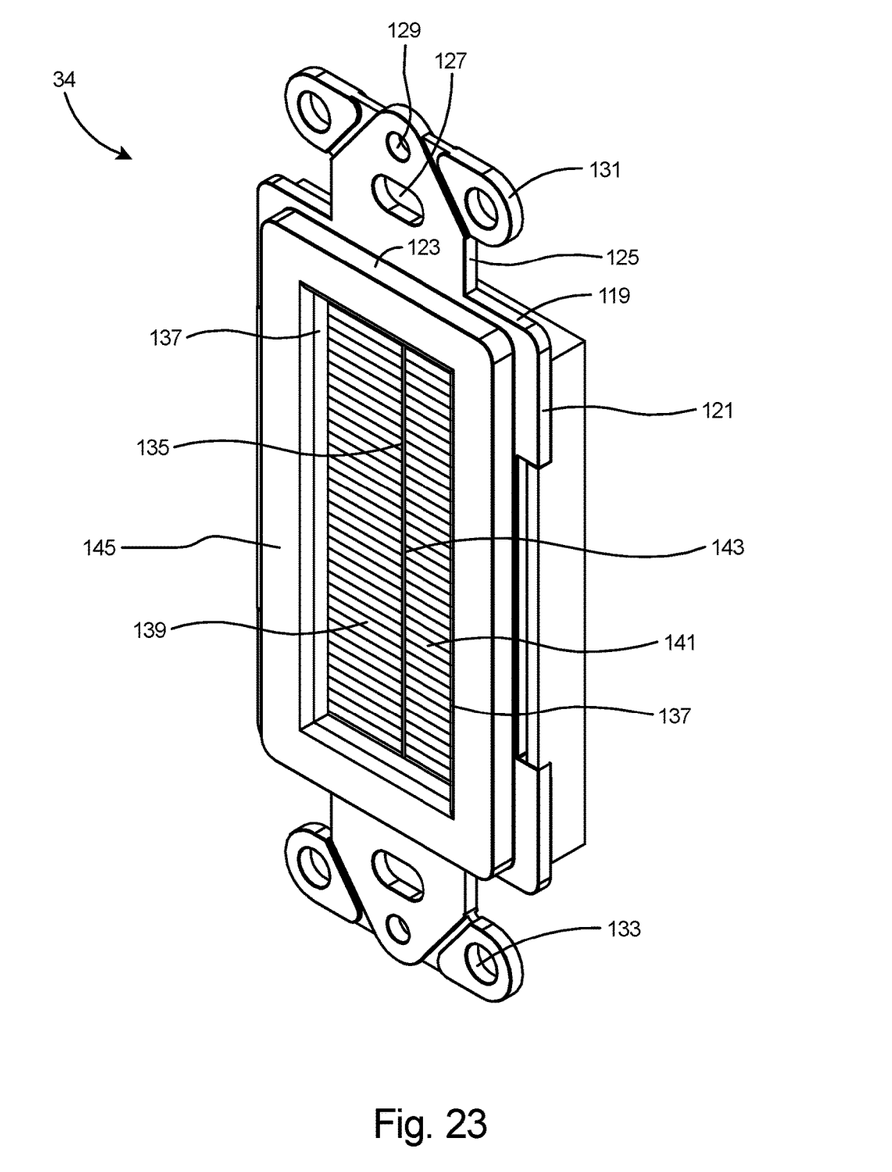
FIG. 23 is an isometric view of a cable entry device that forms a portion of the TV bridge kit of FIG. 1.

Referring to FIG. 23, the cable entry device 34 includes a substantially rectangular bracket body 119 having two sides 121, two ends 123, and an arm 125 extending from each of the ends 123. Each arm 125 includes an inner aperture 127, an outer aperture 129, and two ears 131 having an aperture 133 therein. An opening 135 is provided in the bracket body 119. The opening includes two sides 137 with a row of brushes 139 extending from a first side of the opening 135 and a second row of brushes 141 extending from the opposing side of the opening 135. The brushes 141 include ends 143 that meet at substantially the center of the opening 135 and provide a flexible passageway for insertion of low voltage cables (not shown) there through. The cable entry device 34 includes a front face 145 that projects outward of the bracket body 119. As shown in FIG. 1, after the cable entry device 34 is secured to the electrical box 22 and cover plate 30 is secured to the electrical box, front face 145 of low voltage bracket 34 projects through the low voltage opening 86 of the cover plate.

As shown in FIG. 1, plate fasteners 147 secure the upper cover plate 30 and lower cover plate 32 to the recessed wall 46 of the respective mounting brackets 22 to form a pre-wired TV bridge assembly 20 according to the present invention. Power input end 26 and power output end 28 are secured to the respective cover plates 30 and 32 with fasteners 149 as shown.

With reference to FIG. 1, the pre-wired TV bridge assembly is operated by cutting an upper hole in the wall (not shown) at a location desired for mounting a flat panel TV or similar electrical device. A lower hole is then preferably cut in a location in vertical alignment and below the upper hole in order to enable routing and easy pulling of the power cable 24 behind the wall and through the wall cavity between adjacent joists. The power input end 26 of the power cable 24 is preferably placed into the upper hole, dropped through the wall cavity, and pulled through the lower opening in the wall. The power input end 26 and power output end 28 are pulled through the respective openings 48 of the mounting brackets 22, after which the mounting brackets are secured to the wall by tightening the rotatable clamp arms 111.

Referring to FIGS. 17-22, the cable entry device 34 and power input and power output ends 26 and 28 are then secured to the respective cover plates 30 and 32 by fasteners 149 secured into bosses 92 and 107 respectively. Installation of the TV bridge assembly 20 is completed by securing the upper cover plate 30 and lower cover plates 32 to the respective mounting brackets. Power may then be fed into the wall mounted assembly by plugging the male end of a conventional electrical cord into a nearby electrical outlet and plugging the female end (not shown) onto the prongs 72 of the power input end 26.

Figure 24:
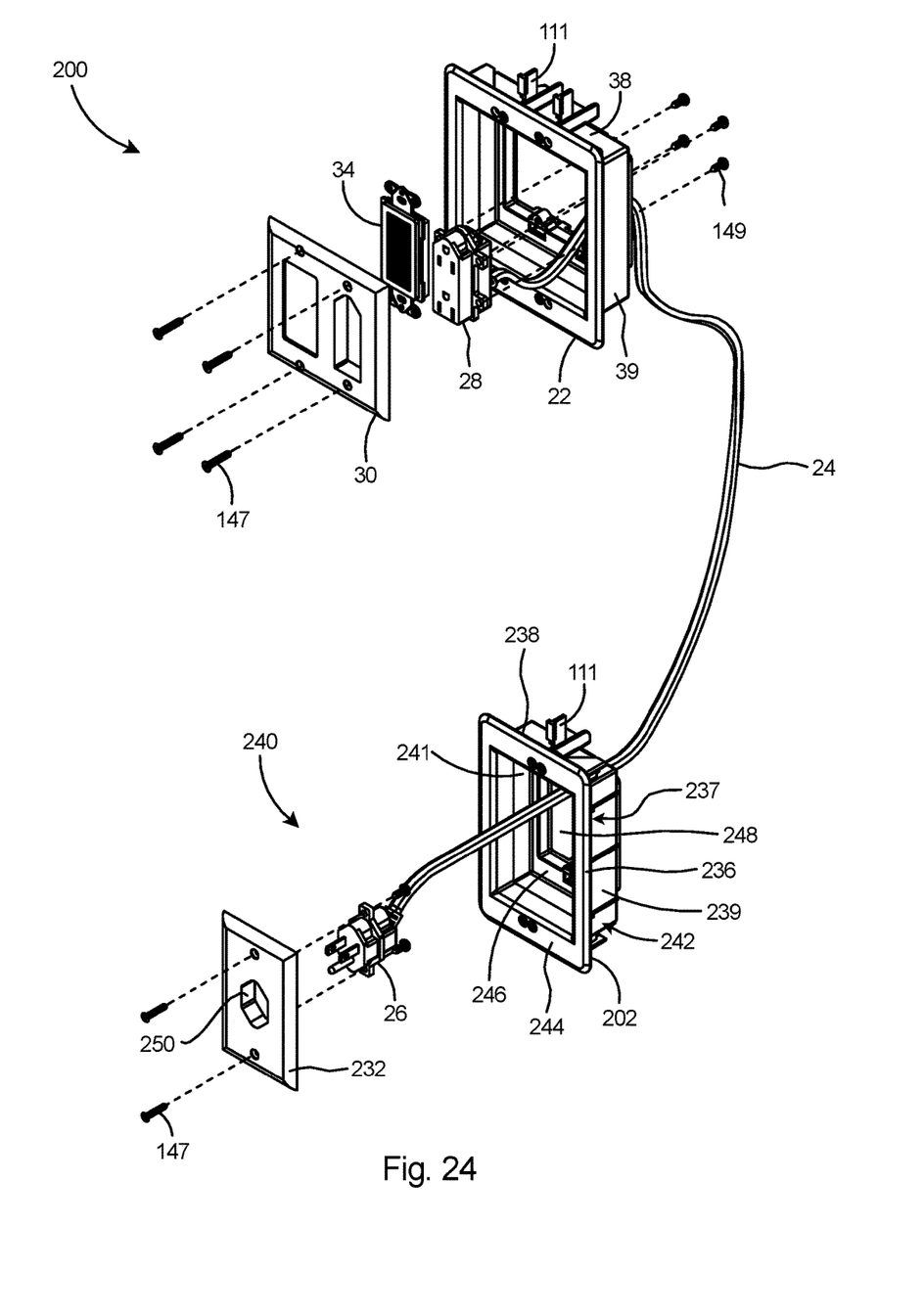
FIG. 24 is a front exploded isometric view of a second embodiment of a pre-wired TV bridge kit according to the invention.

Referring to FIG. 24, a second embodiment of the pre-wired TV bridge kit 200 includes a mounting bracket 22 equivalent to that of the first embodiment and a one-gang box 202. The one-gang box 202, for feeding line voltage into the upper mounting bracket 22, is adapted for connection of cover plate 232. Cover plate 232 includes a collar 250 for connection of the power input end 26 of cable 24. Mounting bracket 202 includes a frame 236 having a rear surface 237, side walls 238, and end walls 239. The one-gang mounting bracket 202, cover plate 232, and power input end 26 of cable 24 form a lower box assembly 240 for feeding line voltage to the mounting bracket. The side walls 238 of the one-gang box 202 include an outer surface 242. A flange 244 extends outward from the side walls and end walls. A recessed wall 246 extends inward from the inner surface 241 of each side wall 238 to an opening 248.

Figure 25:
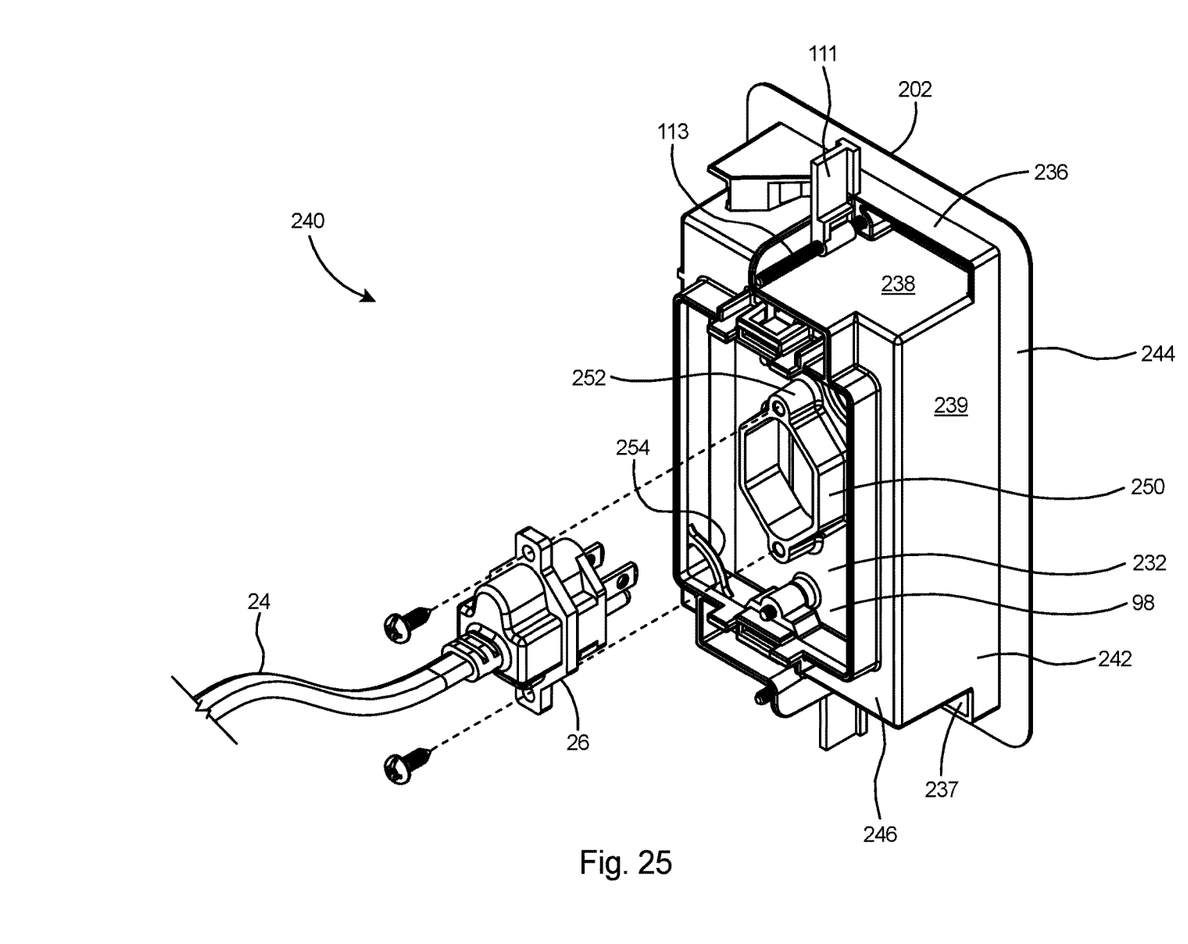
FIG. 25 is a rear isometric view of a lower mounting bracket assembly which forms a portion of the pre-wired TV bridge of FIG. 24.

With reference to the lower box assembly 240 in FIG. 25, the collar 250 extending from the rear surface 98 of the cover plate 232 of the box assembly includes bosses 252 for the mounting of electrical components (not shown). The mounting bracket 202 includes clamp arms 111 on mounting fasteners 113 extending through flange 244 for securing the one-gang box 202 to a wall.

Figure 26:
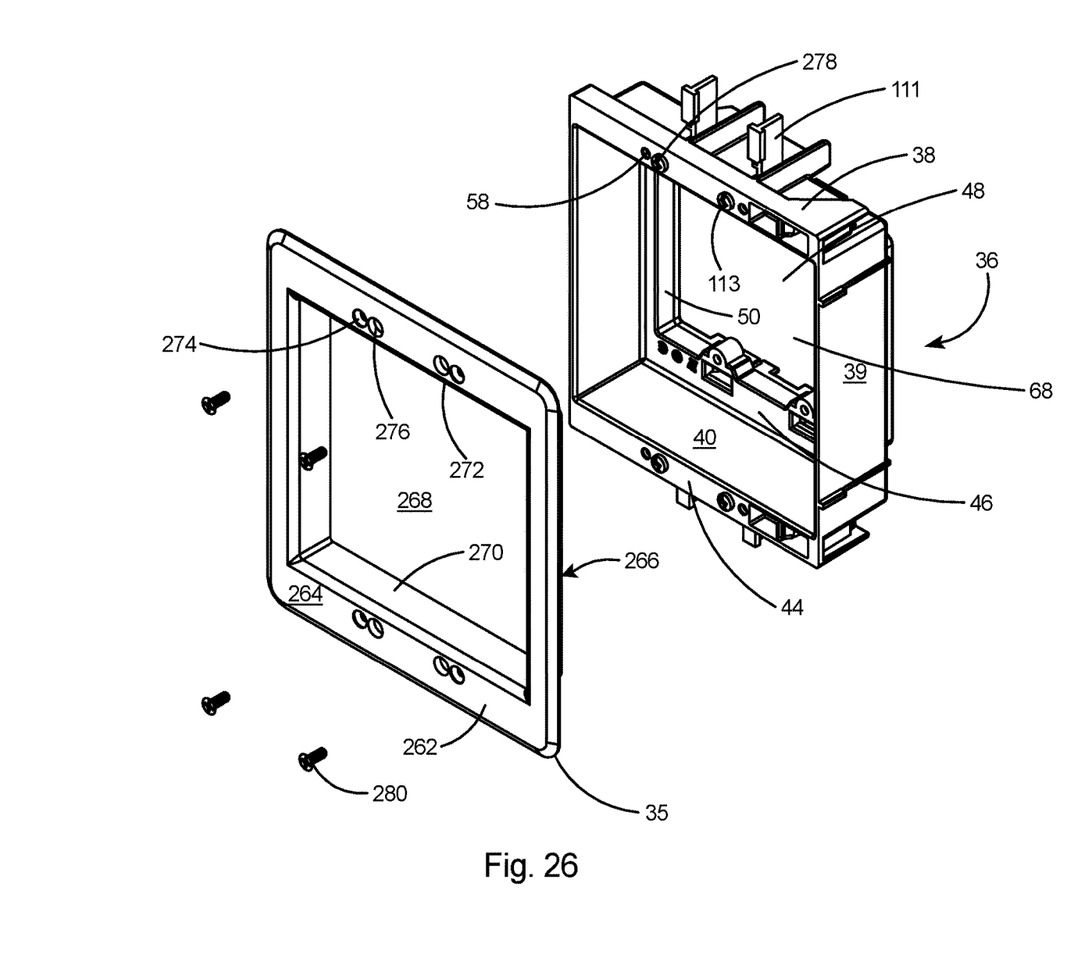
FIG. 26 is a front isometric view of the mounting bracket of FIG. 5 and a trim plate aligned with the mounting bracket for connection thereto.

Referring to FIG. 26, there is shown a trim plate 35 in alignment with the frame 36 portion of a mounting bracket assembly according to the present invention. The trim plate 35 includes a flange 262 with a front side 264, a rear side 266, and an opening 268 therein. A peripheral wall 270 extends from the rear side 266 of the flange 262 around the inner periphery 272 of the opening 268. Outer apertures 274 and inner apertures 276 are provided in the flange 262. The outer apertures 274 in the flange 262 align with outer apertures 58 in the frame 36 and the inner apertures 276 align with mounting fasteners 113 that extend through flange 44 of 36. Inner apertures 276 are oversize with respect to heads 278 of mounting fasteners 113 and the mounting fasteners 113 are threaded through a portion of the rotatable clamp arms 111. The trim plate 35 is secured to the mounting bracket with trim plate fasteners 280. The mounting fasteners 113 for securing the mounting bracket to the wall of a structure (not shown) are accessible and rotatable from the front side 264 of the trim plate. Thus engagement and tightening of mounting fasteners 113 by a screw-driving tool (not shown) will rotate the clamp arms 111 and secure the mounting bracket to the wall of a structure. When trim plate 35 is secured to the mounting bracket, the peripheral wall 270 of the trim plate 35 is nested within the sidewalls 38 and 39 of the mounting bracket. Cover plates 30 and 32 (see FIG. 1) can be secured to the mounting bracket and trim plate 35 assemblies either before or after the trim plate is secured to the mounting bracket.

Figure 27:
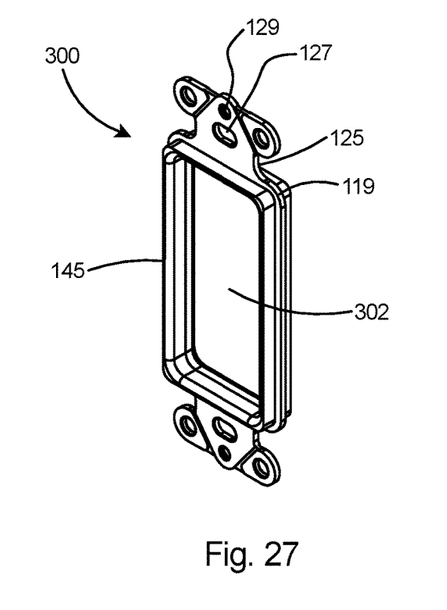
FIG. 27 is an isometric view of an alternate cable entry device according to the present invention.
Figure 28:
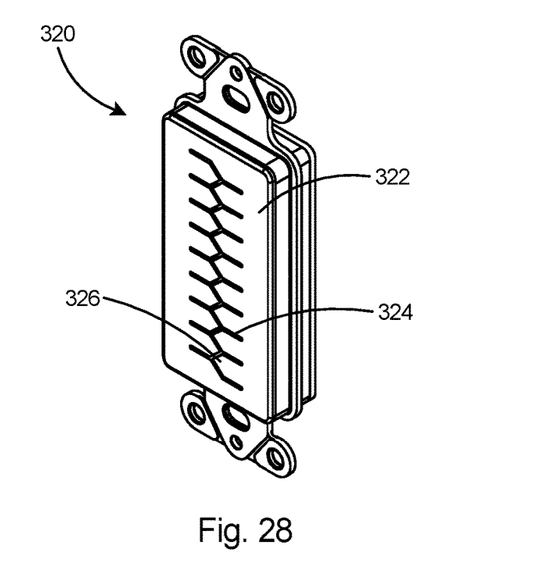
FIG. 28 is an isometric view of an alternate cable entry device according to the present invention.
Figure 29:
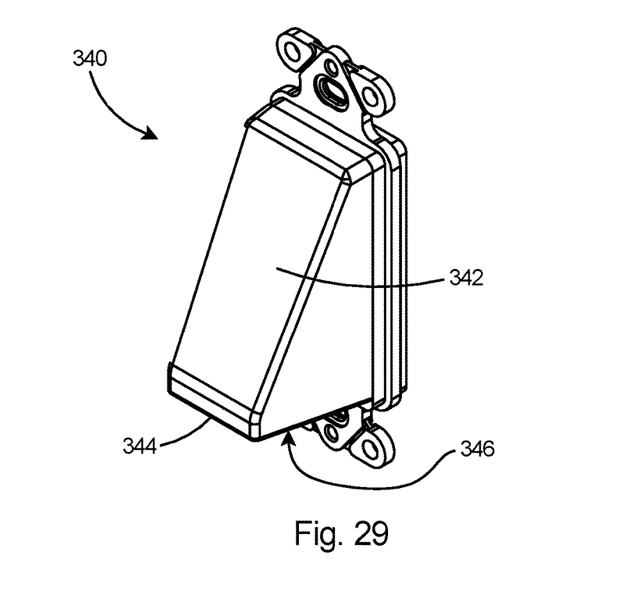
FIG. 29 is an isometric view of an alternate cable entry device according to the present invention.

With reference to FIGS. 27-29, there are shown several alternate embodiments of low voltage brackets that can be used in place of low voltage bracket 34 depicted in FIGS. 1 and 23. The low voltage brackets typically include a bracket body 119, ears 125, inner apertures 127, outer apertures 129, and a front face 145 projecting outward from the bracket body, as shown in FIG. 27. As shown in FIG. 27, low voltage bracket 300 includes an opening 302 within the bracket body 119. The low voltage bracket 320 of FIG. 28 includes a flexible panel 322 extending across the opening of the body, with the panel 322 including a plurality of slots 324 forming flexible arms 326 in the panel. The low voltage bracket 340 of FIG. 29 includes a hood 342 extending from the bracket body 119, the hood including a rim 344 and an opening 346 defined by the rim. Hood 342 of low voltage bracket 344 provides a shield for obscuring any low voltage cables (not shown) that are later fed through the opening 346. The opening 346 can be oriented downward or upward, as selected by the installer, to obscure the view of cables passing there through.

Having thus described the invention with reference to a preferred embodiment, it is to be understood that the invention is not so limited by the description herein but is defined as follows by the appended claims. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention.

What is claimed is:

1. A pre-assembled TV bridge kit, comprising:
    an upper mounting bracket including a flange, a recessed wall, and an upper cover plate;
    a power cable including a power input end and a power output end;
    a cable entry device mounted to said flange of said upper mounting bracket;
    a female receptacle mounted to said upper cover plate;
    a lower mounting bracket including a flange, a recessed wall, and a lower cover plate;
    a cable entry device mounted to said flange of said lower mounting bracket;
    said power input end of said power cable mounted to said lower cover plate;
    said power output end of said power cable mounted to said upper cover plate;
    means for attaching said mounting brackets to a wall;
    a trim plate secured to each of said mounting brackets;
    attachment means for attaching said power input end and said power output end to said cover plates;
    said attachment means for attaching said male plug and said female receptacle to said cover plates including tabs on said power input ends and said power output ends, said tabs including apertures, a peripheral wall on said cover plates; and fasteners for securing through said apertures in said tabs and into said peripheral walls of said cover plates;
    a flange extending from said power input end and a flange extending from said power output end; and
    said tabs extend from said flange of said power input end and from said flange of said power output end.

2. The TV bridge kit of claim 1 wherein said means for attaching said mounting brackets to a wall comprise:
    rotatable clamp arms; and
    mounting fasteners extending through said flange of said mounting brackets and threaded through a portion of said clamp arms.

3. The TV bridge kit of claim 1, further comprising a front face on said power input end and a front face on said power output end.

4. The TV bridge kit of claim 3 wherein
    said front face on said on said power input end is flush with said front surface of said lower cover plate; and
    said front face on said power output end is flush with said front face of said upper cover plate.

5. The TV bridge kit of claim 1, further comprising one or more prongs extending from said power input end of said power cable.

6. The TV bridge kit of claim 1, further comprising:
    a bracket body on said cable entry device;
    two sides and an opening in said bracket body; and
    brushes extending from said sides of said bracket body into said opening of said bracket body.

* * * * *